W. E. MILLER.
STEERING DEVICE FOR TRACTION ENGINES.
APPLICATION FILED OCT. 15, 1913.
1,117,419.
Patented Nov. 17, 1914.
2 SHEETS—SHEET 1.
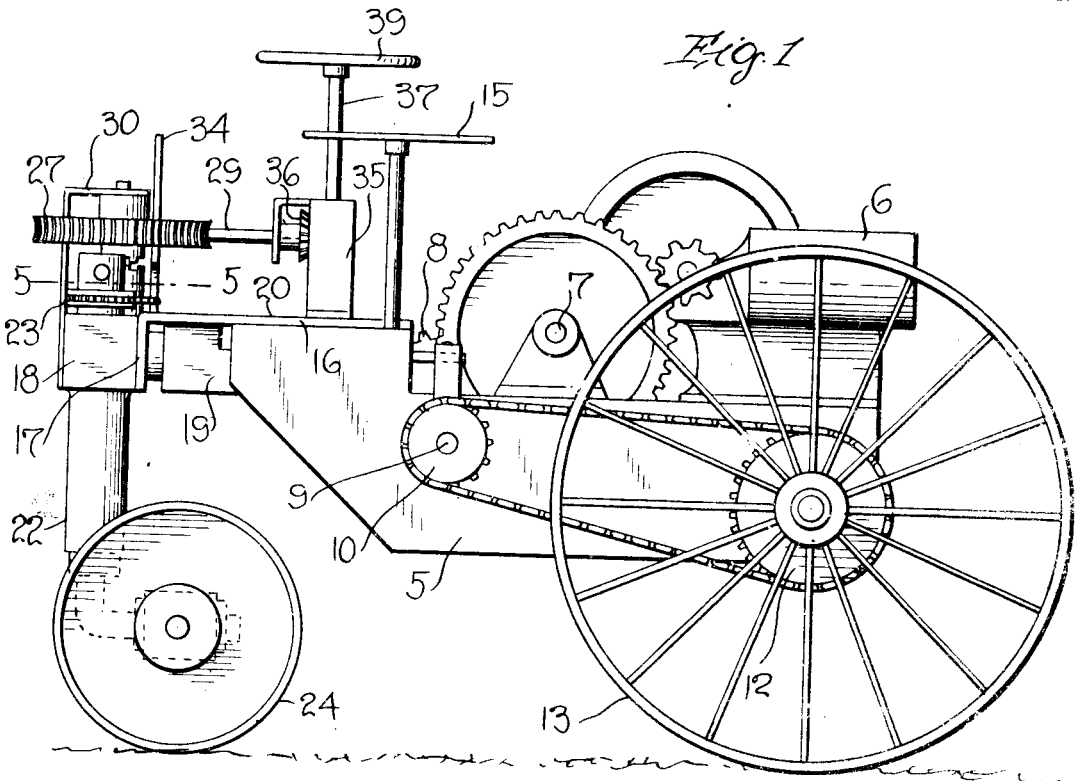
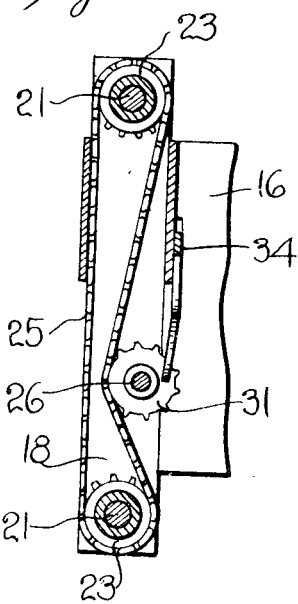
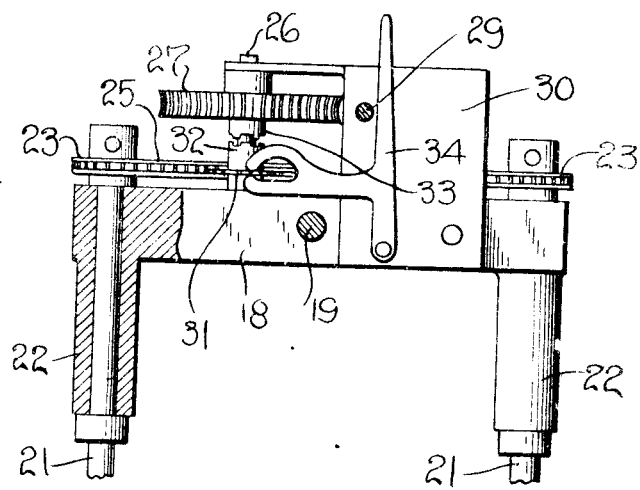
Witnesses
Robert M. Sutphen
V. J. Dowrick
Inventor
W. E. MILLER
By Watson E. Coleman
Attorney W. E. MILLER.
STEERING DEVICE FOR TRACTION ENGINES.
APPLICATION FILED OCT. 15, 1913.
1,117,419.
Patented Nov. 17, 1914.
2 SHEETS—SHEET 2.
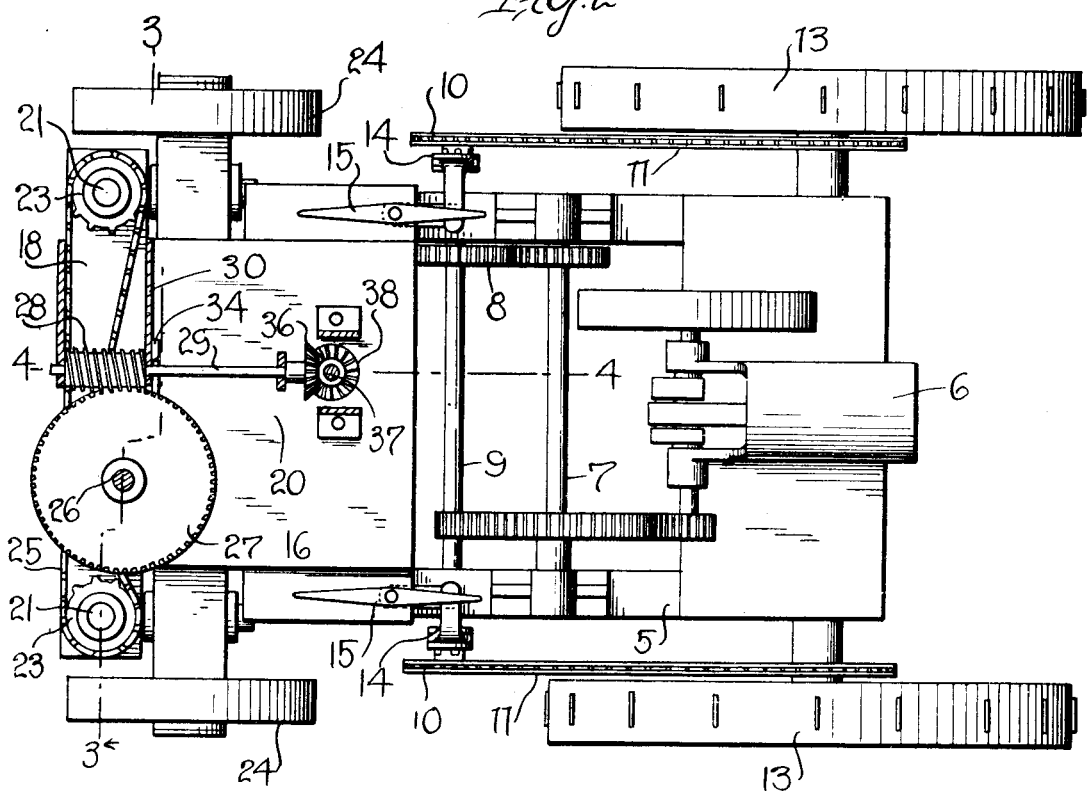
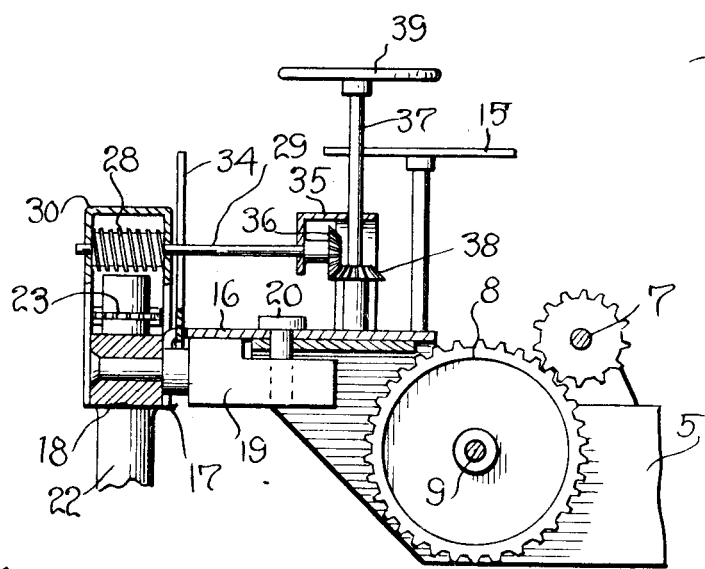
Witnesses
Robert M. Sutphen
V. J. Dowrick
Inventor
W. E. MILLER
By Watson E. Coleman
Attorney

UNITED STATES PATENT OFFICE.

WILLIAM E. MILLER, OF HICKORY, NORTH CAROLINA.

STEERING DEVICE FOR TRACTION-ENGINES.

1,117,419.   Specification of Letters Patent.   Patented Nov. 17, 1914.

Application filed October 15, 1913. Serial No. 795,380.

*To all whom it may concern:*

Be it known that I, WILLIAM E. MILLER, citizen of the United States, residing at Hickory, in the county of Catawba and State of North Carolina, have invented certain new and useful Improvements in Steering Devices for Traction-Engines, of which the following is a specification, reference being had to the accompanying drawings.

This invention relates to steering devices for traction engines and has for its primary object to provide means whereby the engine may be readily steered or guided by the operator and which will permit the entire machine to be turned within the radius of its own length.

My invention has for another object the provision of two sets of steering wheels, each having a vertical spindle, an endless chain connecting said spindles, and mechanism including a releasable pinion engaged with said chain whereby the steering wheels may be positively actuated by the operator to guide the machine, or released for free turning movement, when it is desired to turn the machine in a circular path.

The invention has for still another object to provide a very simple and durable steering mechanism for traction engines which is highly efficient and reliable in practical operation and may be produced at comparatively small manufacturing cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a traction engine provided with my improved steering device; Fig. 2 is a top plan view, certain of the parts being in section; Fig. 3 is a section taken on the line 3—3 of Fig. 2; Fig. 4 is a section taken on the line 4—4 of Fig. 2; Fig. 5 is a section taken on the line 5—5 of Fig. 1.

Referring in detail to the drawing, 5 designates the frame of the machine in which an engine 6 is suitably mounted. The shaft of this engine is geared to the transverse shaft 7 which shaft in turn is provided with a pinion meshing with a gear 8 upon the countershaft 9. Upon the opposite ends of this shaft, the sprocket wheels 10 are loosely mounted. These wheels are connected by sprocket chains 11 to the sprockets 12 which are carried by the ground wheels 13 that support the machine frame. Sliding clutch members 14 are keyed upon opposite ends of the countershaft 9 for locking engagement with the respective wheels 10. These clutch members are adapted to be actuated by suitable means indicated at 15.

A bed plate 16 is secured upon one end of the machine frame and is provided with a down-turned flange 17 to which the transverse bar 18 is securely bolted or otherwise fixed. The central longitudinal bolt 19 is also fixed at one of its ends to this bar and extends beneath the rear end of the machine frame to which said bolt is secured, by means of the bolt 20 which secures the bed plate in position.

In each end of the transverse bar 18, a vertical spindle 21 is rotatably mounted, the ends of said bar being provided with depending sleeves 22 which serve as bearings for the spindles. To the upper end of each of these spindles a sprocket pinion 23 is fixed and upon the lower end of each spindle, the spaced steering wheels 24 are rotatably mounted in any approved manner. The sprocket pinions 23 are connected by the endless chain 25.

Upon a perpendicular shaft 26 which is fixed at its lower end in the transverse bar 18, a worm gear 27 is loosely mounted. The teeth of this gear are engaged by a worm 28 secured upon one end of a longitudinally disposed shaft 29. This worm is arranged within a suitable housing 30 fixed to the transverse bar 18. A pinion 31 is also loosely mounted upon the stationary vertical shaft 26 and is engaged with one stretch of the chain 25. This pinion is provided with clutch teeth 32 for engagement with similar teeth 33 upon the bottom face of the worm gear 27. A lever 34 is pivotally mounted upon one wall of the housing 30 and engaged with the pinion 31 to shift the same into or out of locking engagement with the gear 27. The forward end of the shaft 29 is mounted in a suitable bracket or housing 35 fixed upon the bed plate 16, and to this forward end of said shaft, a beveled pinion 36 is secured. The steering shaft 37 which is mounted upon the bed plate is also provided with a beveled pinion 38 for engagement with the pinion 36. The upper end of this shaft is provided with the usual hand wheel 39 whereby said shaft is operated.

In the normal operation of the machine, during its movement across the field, the sprocket pinion 31 is in locked engagement with the worm gear 27, so that when the operator rotates the steering shaft, the wheels 24 will be simultaneously turned in the desired direction to guide the machine in its movement. When the end of the field is reached, and it is desired to turn the machine, the operator applies the brake to one of the ground wheels 13, and shifts one of the clutches 14 whereby the other of the ground wheels is positively driven from the countershaft 9. The pinion 31 is then released by shifting the lever 34 so that the wheels 24 may freely turn independently of the steering connections. These wheels in the forward movement of the machine will turn at approximately right angles to the body of the machine so as to turn the machine in a circular path, the radius of which is approximately equal to the length of the machine.

From the foregoing, it is thought that the construction and manner of operation of my improved steering device for traction engines will be clearly and fully understood. The device admits of the easy and quick turning of the machine without subjecting the steering connections to undue strains. By mounting the steering wheels and connecting the same to the steering mechanism as above described, the machine may be easily guided or steered across the field with but little effort on the part of the operator. It will be apparent that my improved steering mechanism may be applied to the several forms of traction engines now in general use, without necessitating any material alterations in their construction. It will further be obvious that the invention is susceptible of various minor modifications in the form, proportion and arrangement of the several elements employed and I therefore reserve the right to resort to all such legitimate changes as may be fairly embodied within the spirit and scope of the invention, as claimed.

Having thus described the invention, what is claimed is:

In a steering device for traction engines, the combination with a bed plate secured to the engine frame and having a transversely disposed downwardly extending flange, a transversely extending bar, a bolt extending through said bar and flange and rigidly secured to the under side of the bed plate, vertically disposed spindles rotatably mounted in the ends of said transverse bar, steering wheels on the lower ends of said spindles, sprocket pinions fixed to the upper ends of said spindles, an endless chain connecting said pinions, a housing mounted upon said bar, a worm rotatably mounted in said housing, a worm gear meshing with said worm, a steering shaft geared to the worm shaft, a pinion loosely mounted upon said bar and engaged with one stretch of said chain, and a lever to shift said pinion into and out of locking engagement with the worm gear whereby said chain is positively actuated from the steering shaft or released for movement independently thereof.

In testimony whereof I hereunto affix my signature in the presence of two witnesses.

WILLIAM E. MILLER.

Witnesses:
C. A. MOSER,
O. M. SIGMON.